(12) United States Patent
Okazaki et al.

(10) Patent No.: US 6,386,499 B1
(45) Date of Patent: May 14, 2002

(54) SEAT SLIDE DEVICE FOR A VEHICLE

(75) Inventors: Hiroyuki Okazaki, Chiryu; Yukifumi Yamada, Toyota; Satoshi Hisada, Nishio, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/472,434

(22) Filed: Dec. 27, 1999

(30) Foreign Application Priority Data

Dec. 24, 1998 (JP) .......................................... 10-365798

(51) Int. Cl.$^7$ .............................................. F16M 13/00
(52) U.S. Cl. .......................... 248/430; 248/429; 384/47
(58) Field of Search ................................ 248/430, 419, 248/423, 424, 429, 420; 384/47

(56) References Cited

U.S. PATENT DOCUMENTS

| | | | |
|---|---|---|---|
| 3,847,452 A | * 11/1974 | Harder, Jr. et al. | 384/47 |
| 3,944,302 A | * 3/1976 | Fourrey | |
| 4,068,887 A | * 1/1978 | Babbs | 297/216 |
| 4,209,159 A | * 6/1980 | Becker et al. | 248/430 |
| 4,483,504 A | * 11/1984 | Duwelshoft | 248/429 |
| 4,511,187 A | * 4/1985 | Rees | 308/3.8 |
| 4,787,756 A | * 11/1988 | Pilarski | 384/47 |
| 4,901,421 A | * 2/1990 | Takarabe et al. | 29/437 |
| 5,076,530 A | * 12/1991 | Dove et al. | 248/430 |
| 5,370,350 A | 12/1994 | Okano et al. | |
| 5,407,166 A | * 4/1995 | Pilarski | 248/430 |
| 5,529,397 A | * 6/1996 | Yoshida | 384/47 |
| 5,848,775 A | * 12/1998 | Isomura et al. | 248/430 |
| 5,855,350 A | * 1/1999 | Volker et al. | 248/430 |

FOREIGN PATENT DOCUMENTS

| | | |
|---|---|---|
| AU | 564935 | 11/1983 |
| DE | 25 49 711 A1 | 5/1977 |
| DE | 33 42 503 A1 | 6/1985 |
| DE | 37 41 427 C2 | 11/1998 |
| JP | 55-26010 | 7/1980 |

* cited by examiner

Primary Examiner—Anita King
(74) Attorney, Agent, or Firm—Burns, Doane, Swecker & Mathis, LLP

(57) ABSTRACT

A seat slide device for a vehicle includes a lower rail fixed on the floor of the vehicle, and an upper rail slidably supported on the lower rail through intermediately located members such as rollers and balls. The upper rail has a horizontal portion possessing an outer face adapted to be connected with a seat cushion frame and an inner face contacting the intermediately located members. The horizontal portion of the upper rail possesses a stepped portion dividing the horizontal portion of the upper rail into a connection portion adapted to be connected to the seat cushion frame and a contact portion which contacts the intermediate members. By dividing the horizontal portion of the upper rails into the connection portion and the contact portion, possible adverse affects associated with distortion resulting from welding the upper rail to the cushion frame is significantly reduced and preferably avoided. The seat slide device also provides smooth rolling of the rollers and the balls, and undesirable sliding force increase or large engagement play of the seat slide device is avoided. It is also possible to directly weld the upper rail and the cushion frame, and the number of required parts and the height of the seat device can be reduced. Also, the welding process is made easier by providing a space between the cushion frame and the slide portion of the upper rail.

14 Claims, 6 Drawing Sheets

SEAT SLIDE DEVICE FOR A VEHICLE

This application is based on and claims priority under 35 U.S.C. § 119 with respect to Japanese Application No. 10(1998)-365798 filed on Dec. 24, 1998, the entire content of which is incorporated herein by reference.

FIELD OF THE INVENTION

The present invention generally relates to vehicle seats. More particularly, the present invention pertains to a vehicle seat slide device for holding a vehicle seat device on a vehicle floor in a manner allowing adjustment of the position of the vehicle seat device.

BACKGROUND OF THE INVENTION

Japanese Patent Publication No. 55 (1980)-26010 discloses a seat slide device that includes a lower rail fixed on the vehicle floor and an upper rail fixed under the seat device. The upper rail slides on the lower rail through the intermediary of rollers. The outer face of the upper portion of the upper rail is welded with the seat device, and the rollers are arranged to contact the inner face of the upper portion of the upper rail. The welding heat causes distortion of the face of the upper rail's upper portion. This distortion has a tendency to adversely affect the smooth rolling of the rollers and cause an undesirable sliding force increase or large engagement play of the seat slide device.

A need thus exists for a seat slide device for a vehicle which is not susceptible to the same disadvantages and drawbacks as those associated with other known seat devices such as described above.

SUMMARY OF THE INVENTION

In light of the foregoing, the present invention provides a seat slide device for a vehicle that includes a lower rail fixed on the floor of the vehicle and an upper rail slidably supported on the lower rail through intermediately located members. The upper rail possesses a horizontal portion having an outer face adapted to be connected with a seat cushion frame and an inner face contacting the intermediately located members. The horizontal portion of the upper rail has a stepped portion dividing the horizontal portion of the upper rail into a connection portion adapted to be connected to the seat cushion frame and a contact portion which contacts the intermediately located members.

According to another aspect of the invention, a seat slide device for a vehicle includes a seat cushion having a seat cushion frame, a lower rail fixed on the floor of the vehicle, and an upper rail slidably supported on the lower rail by way of intermediately located slide permitting members that permit the upper rail to slide relative to the lower rail. The upper rail has a first portion possessing an outside surface facing towards the seat cushion frame. The first portion of the upper rail possesses a connection portion and a contact portion, with the outside surface of the connection portion being connected to the seat cushion frame and the outside surface of the contact portion being elevationally offset from the outside surface of the seat cushion frame to define a clearance between the outside surface of the contact portion and the seat cushion frame.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
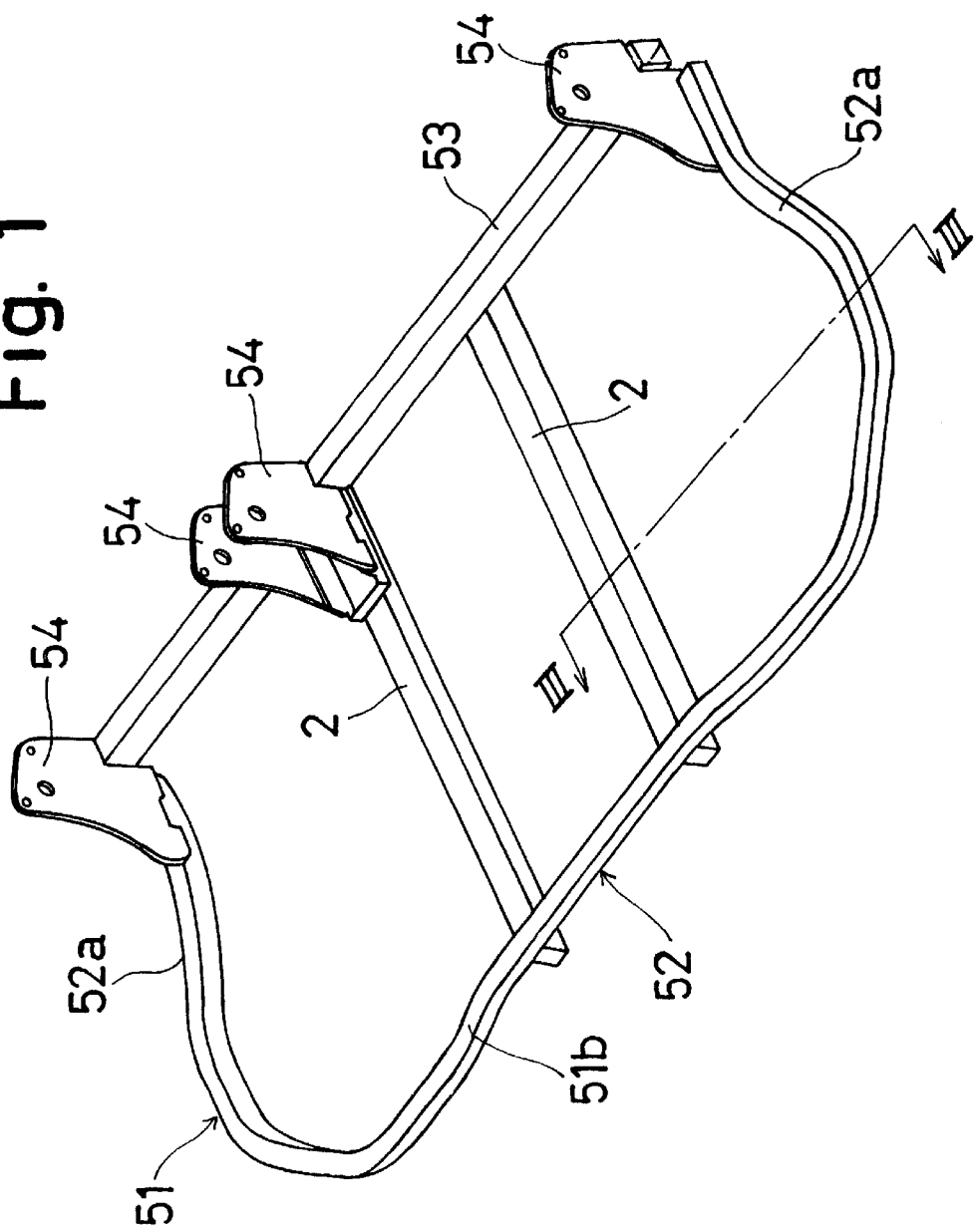
FIG. 1 is a perspective view of the seat device frame on which the seat slide device is installed in accordance with the present invention.
Figure 3:
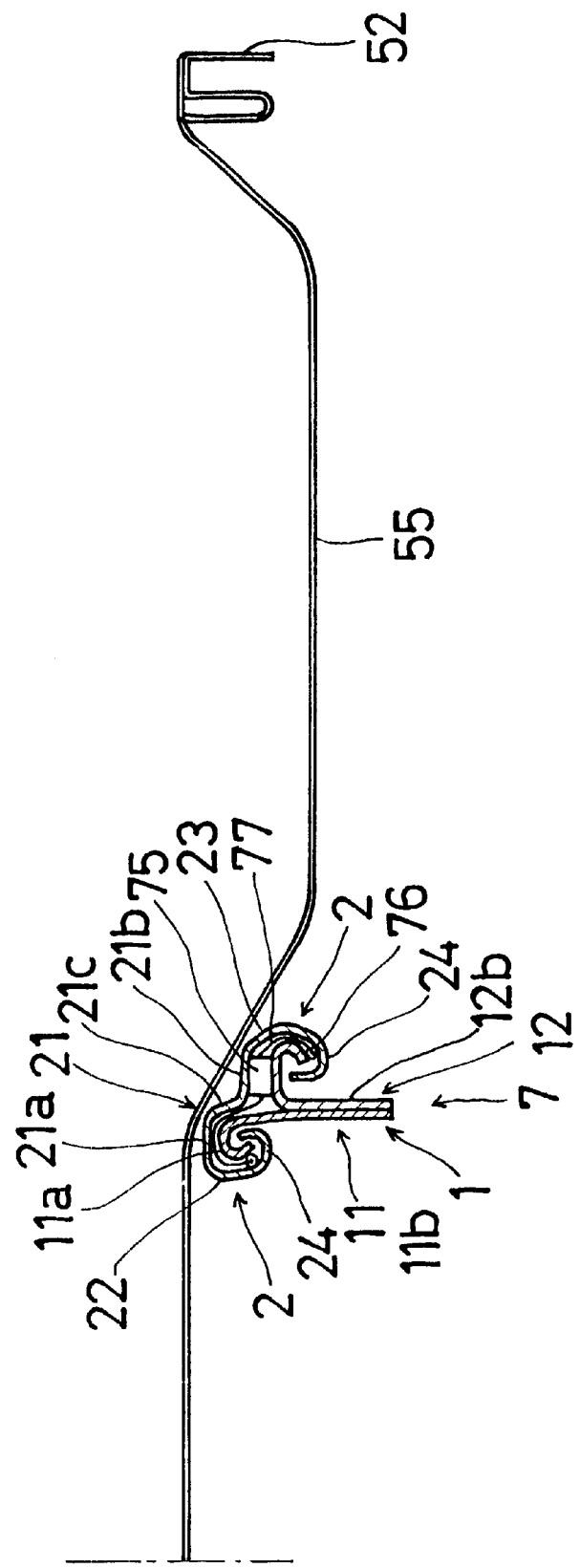
FIG. 3 is a cross-sectional view of a portion of the seat slide device in accordance with the present invention taken along the section line III—III in FIG. 1.

Referring initially to FIGS. 1 and 3, the seat slide device 7 for a vehicle seat in accordance with a preferred embodiment of the present invention includes a pair of lower rails 1 (i.e., right and left lower rails 1) secured on the vehicle floor 8, a pair of upper rails 2 (i.e., right and left upper rails 2) on which the seat device 4 is held, and a lock plate 3 arranged between the lower rail 1 and the upper rail 2.

The seat device 4 is comprised of a seat cushion 5 and a seat back 6 mounted on the rear potion of the seat cushion 5. The seat back 6 is mounted on the seat cushion 5 in a way that allows the seat back to rotate relative to the seat cushion 5.

The seat cushion 5 is mounted on a cushion frame 51 so that the cushion frame 51 forms a framework for the seat cushion 5. The cushion frame 51 includes a front frame 52 possessing a rectangular cross-section and located along the front and opposite side edges of the seat cushion 5, and a rear frame 53 also possessing a rectangular cross-section and located along the rear edge of the seat cushion 5. The end portions of the front frame 52 and the end portions of the rear frame 53 are connected to each other by a pair of lower arms 54. The lower arms 54 pivotally support the seat back 6. A cushion pan 55 shown in FIG. 3 is installed on the cushion frame 51, the cushion is placed on the cushion pan 55, and the seat cushion 5 is covered by a seat cover that is hooked to the cushion frame 51. The cushion pan 55 has a sunken surface generally fitting to the passenger's body profile.

The upper rails 2 are elongated members and are located parallel to the side portions 52a of the front frame 52 of the seat cushion 5. The front end portion of each upper rail 2 is connected to the front portion 51b on the front frame 52 and the rear portion of each upper rail 2 is connected to the rear frame 53. A pair of lower arms 54 which pivotally support the seat back are attached at the rear end portion of one upper rail 2. Thus, the seat back 6 is comprised of two seat back parts 6 which are each independently supported on and rotated with respect to a respective pair of the lower arms 54.

Each lower rail 1 also forms an elongated member and is located parallel to a respective one of the upper arms 2. The front end of each lower rail 1 is pivotally held on the vehicle floor 8, with the rear end of each lower arm 1 being adapted to engage with or disengage from the floor 8.

Figure 6:
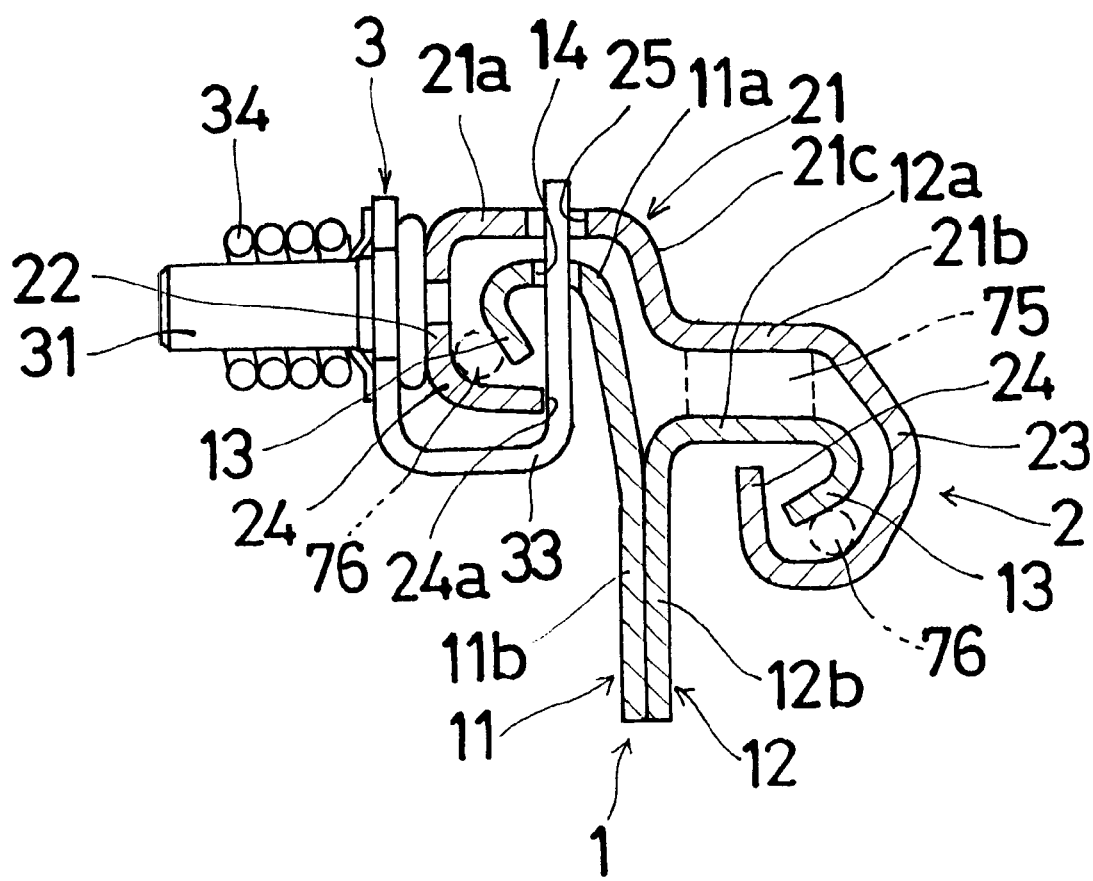
FIG. 6 is a cross-sectional view of a portion of the seat slide device illustrating the lock plate supporting portion.

As shown in FIG. 3 and FIG. 6, the upper rail 2 has a somewhat U-shaped cross-section and includes a horizontal portion 21 and two side portions 22, 23 each extending downwardly from one of the sides of the horizontal portion 21. The horizontal portion 21 defines a seat cushion frame facing portion that faces towards the seat cushion frame 51. A flange portion 24, 24 extends from the lower end of each of the side portions 22, 23. The flange portions 24 extend or are bent towards the inside of the upper rail 2 and upwardly as shown in FIG. 6.

Each upper rail 2 includes a stepped portion 21c that divides the horizontal portion of the upper rail into a connection portion 21a (upper portion) and a contact portion 21b (lower portion). The stepped portion 21c extends between the connection portion 21a of the horizontal portion 21 and the contact portion 21b of the horizontal portion 21. The inner side portion 22 integrally extends from the connection portion 21a to form a continuation of the connection portion 21a. The outer side portion 23 integrally extends from the contact portion 21b to form a continuation of the contact portion 21a.

Figure 4:
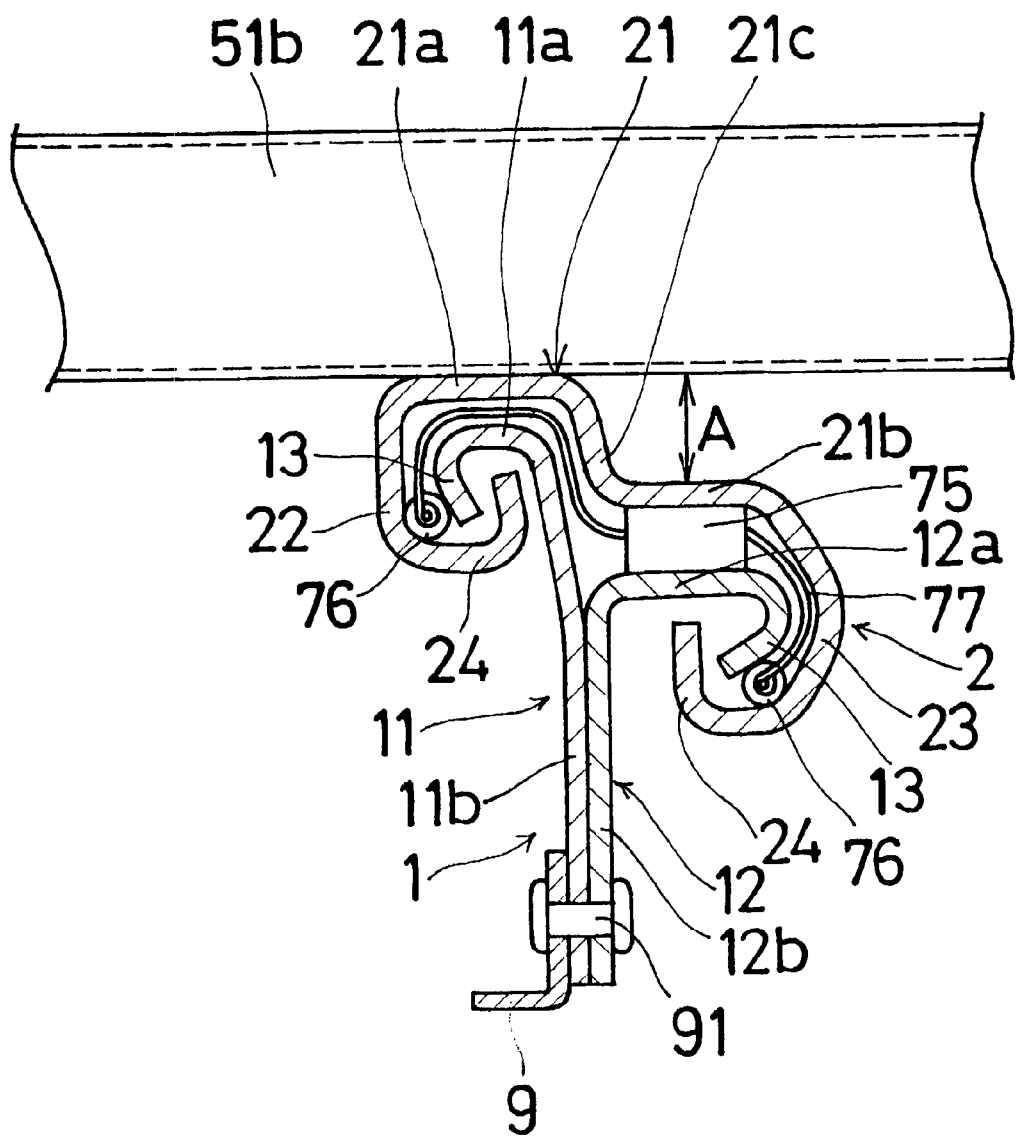
FIG. 4 is a cross-sectional view of the front portion of the seat slide device in accordance with the present invention.
Figure 5:
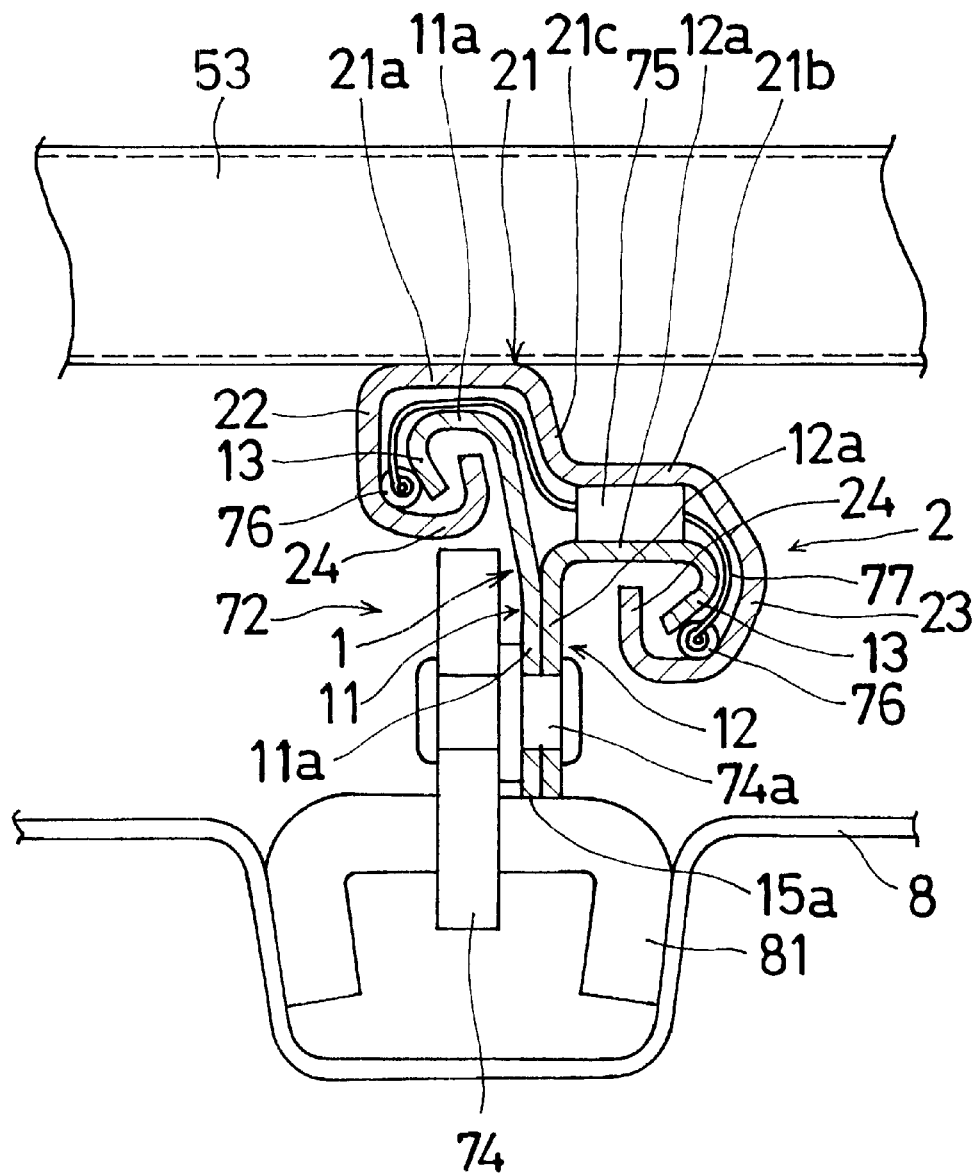
FIG. 5 is a cross-sectional view of the rear portion of the seat slide device in accordance with the present invention.

The outside face of the connection portion 21a and the lower face of the cushion frame 51 which face each other are welded together as illustrated in FIG. 4. The height clearance A between the connection portion 21a and the contact portion 21b makes the welding process relatively easy. This clearance A also provides clearance making is possible to hold the seat pan 55 on the lower position as compared to conventional seat devices.

Figure 2:
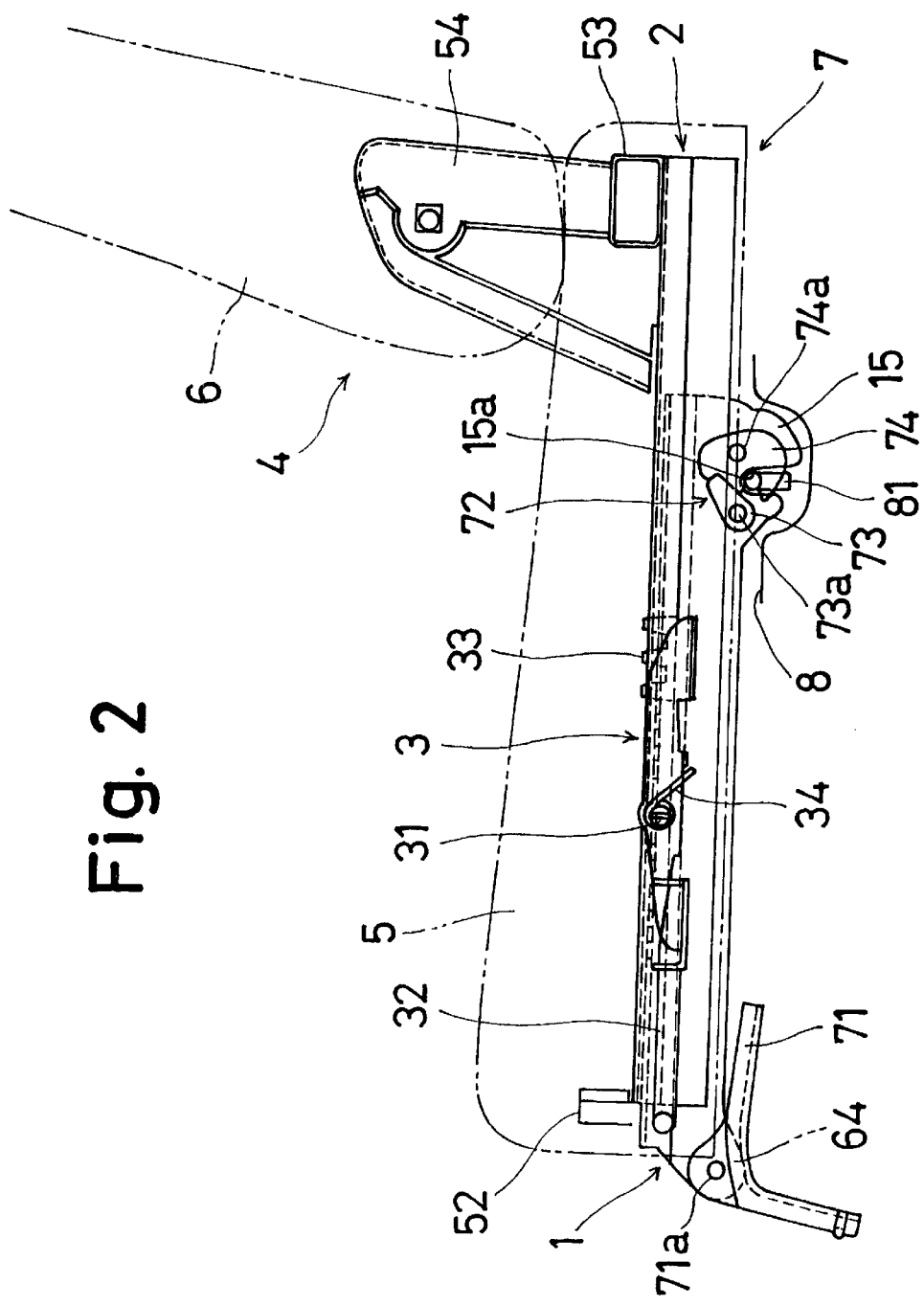
FIG. 2 is a side view of the seat slide device in accordance with the present invention.

The lower rail 1 has a generally T-shaped cross-sectional profile as shown in FIGS. 3–6 that is defined by a pair of generally L-shaped plate parts 11, 12. The one plate part 11 includes a horizontal wall portion 11a and a vertical wall portion 11b, while the other plate part 12 also includes a horizontal wall portion 12a and a vertical wall portion 12b. Thus, the cross-sectional profile of the lower rail 1 is defined by the pair of horizontal wall portions 11a, 12a and the pair of vertical wall potions 11b, 12b. The two generally L-shaped plate parts 11, 12 are welded to each other on their vertical wall potions 11b, 12b. A flange portion 13, 13 is provided at the end of each of the horizontal portions 11a, 12a. These flange portions 13 extend obliquely downwardly from the respective horizontal portions 11a, 12a As shown in FIG. 2, a forward plunging arm portion 64 is formed on each lower rail at the front end of the welded vertical wall portions 11b, 12b. A hinge bracket 71 is pivotally held on each arm portion 64 by a pin 71a. The front end of each lower rail 1 is thus pivotally held on the floor 8. An anchor portion 15 is formed on the rear end of the lower rail 1 and extends downwardly. A lock mechanism 72 is held on the anchor portion 15. The lock mechanism 72 is a well known type of lock mechanism comprising a pawl 73 and a latch 74 pivotally held on the anchor portion 15 by pins 73a, 74a. The latch 74 rotation is controlled by the engagement of the pawl 73 with the latch 74. The latch 74 is adapted to engage a striker 81 which is fixed on the floor 8 and is received in a U-shaped groove formed on the anchor 15a. The rear end of the lower rail 1 is thus supported to engage with or disengage from the floor 8. An operating lever (not shown) is connected with the pawl 73 to control engagement with the latch 74.

As shown in FIG. 3 and FIG. 6, the horizontal portions 11a, 12a and the flange portion 13 of the lower rail 1 are included inside the respective upper rail 2, the horizontal portions 11a, 12a of the lower rail 1 are parallel to and face towards the horizontal portion 21 of the upper rail 2, and the flange portions 13 of the lower rail 1 face towards the corner portions formed between the flange portions 24 of the upper rail 2 and the side portions 22, 23. A plurality of rollers 75 are arranged between the horizontal portion 12a of the lower rail 1 and the contact portion 21b of the horizontal portion 21 of the upper rail 2 so that the rollers 75 roll on the inner face of the contact portion 21b and the upper face of the horizontal portion 12a. Also, a plurality of balls 76 are arranged between the flange portions 13, 13 of the lower rail 1 and the corner portions of the upper rail 2 formed between the flange portions 24 of the upper rail 2 and the side portions 22, 23. The rollers 75 and the balls 76 form slide permitting elements that permit the upper rails to slide relative to the lower rails 1. Thus, each upper rail 2 is supported to slide on the respective lower rail 1. The rollers 75 and balls 76 are held by a retainer plate 77, and are installed in the form of a set.

As shown in FIG. 2 and FIG. 6, the lock plate 3 is an elongated member and extends in parallel with the inner side portion 22 of the upper rail 2. The lock plate 3 is pivotally held by a pin 31 which is fixed on the inner side portion 22 of the upper rail 2. An operation handle 32 is fixed at the front end of the lock plate 3 and an engagement tip portion 33 is formed on the other end of the lock plate 3. The engagement tip portion 33 has a U-shaped cross-section and is arranged to extend around and under the flange portion 24 of the upper rail 2. An engagement groove 24a is formed on the flange portion 24 extending from the inner side portion 22 of the upper rail 2, This engagement groove 24a receives the engagement tip portion 33 of the lock plate 3.

A plurality of engagement openings 14 formed at specified intervals are formed on the horizontal portion 11a of the lower rail 1. The horizontal portion 21 of the upper rail 2 is also provided with a plurality of penetration openings 25 that face the engagement openings 14. The engagement tip portion 33 extends into the engagement openings 14 and the penetration openings 25 to thereby control the slide operation of the upper rails 2 on the lower rail 1. A spring 34 is installed around the pin 31 to bias the lock plate 3 in the counter clockwise direction in FIG. 2 to cause the engagement tip portion 33 to engage the engagement openings 14 and the penetration openings 25.

Having described the features associated with the seat slide device of the present invention, the operation of the seat slide device 7 is as follows. By operating the operation handle 32 to rotate the lock plate 3 in the clockwise direction in FIG. 2 against the biasing force of the spring 34, the engagement tip portion 33 disengages from the engagement openings 14 and the penetration openings 25. The upper rails 2 are thus able to slide on the lower rails 1 so that the back and forth position of the seat 4 on the floor 8 is adjustable.

When the operation handle 32 is released to be free, the engagement tip portion 33 again engages the engagement openings 14 and the penetration openings 25 to thereby limit the sliding movement of the upper rails 2 and thereby fix the position of the upper rails 2 relative to the lower rails 1.

By operating the handle that actuates the lock mechanism 72, that is when the pawl 73 is released from engagement with the latch 74, the latch 74 disengages from the striker 81. Then, by rotating the lower rail 1 around the pin 71a, the seat device can be turned over on the floor 8 to effect a seat device turning over operation. Before the seat device turning over operation, the seat back 6 has to be folded forwardly over the seat cushion 5 so that the seat back 6 lies in overlying relation to the seat cushion 5.

In accordance with the present invention, by dividing the horizontal portion of the upper rails into the connection portion and the contact portion, the adverse affects associated with the distortion caused by the welding of the upper rail and the cushion frame is significantly reduced and preferably avoided. The seat slide device of the present invention provides smooth rolling of the rollers and the balls, and undesirable sliding force increase or large engagement play of the seat slide device can be avoided. The present invention also makes it possible to effect a direct welding connection of the upper rail and the cushion frame. Thus, the number of required parts and the height of the seat device can be reduced. Also, the present invention makes the welding process easier by providing a space between the cushion frame and the slide portion of the upper rail.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A seat slide device for a vehicle having a floor comprising:

a lower rail for being fixed on the floor of the vehicle; and an upper rail slidably supported on the lower rail through intermediately located members, the upper rail having a horizontal portion possessing an outer face adapted to be connected with a seat cushion frame and an inner face contacting the intermediately located members, the upper rail including no more than one stepped portion dividing the horizontal portion of the upper rail into a connection portion adapted to be connected to the seat cushion frame and a contact portion which contacts the intermediately located members the upper rail including a pair of side portions and a pair of flange portions, each side portion extending from an end of the horizontal portion and each flange portion extending from one of the side portions.

2. The seat slide device for a vehicle according to claim 1, wherein the stepped portion is configured to form a clearance between the contact portion of the horizontal portion of the upper rail and the cushion frame when the connection portion of the upper rail is connected to the seat cushion frame.

3. The seat slide device for a vehicle according to claim 1, wherein the lower rail includes a pair of plate parts connected to each other, each plate part possessing a vertical wall portion, a horizontal wall portion extending from the vertical wall portion, and a flange portion extending obliquely from the horizontal wall portion.

4. The seat slide device for a vehicle according to claim 1, wherein said flange portions extend inwardly and upwardly.

5. The seat slide device for a vehicle according to claim 1, including a hinge bracket connected to a forward end of said lower rail to permit pivoting connection of the lower rail to the floor of the vehicle.

6. The seat slide device for a vehicle according to claim 5, including a lock mechanism positioned at a rear portion of the lower rail to lock the lower rail to the floor of the vehicle.

7. A seat slide device for a vehicle having a floor comprising:

a seat cushion including a seat cushion frame;

a lower rail for being fixed on the floor of the vehicle; and an upper rail slidably supported on the lower rail by way of intermediately located slide permitting members that permit the upper rail to slide relative to the lower rail, the upper rail having a first portion possessing an outside surface facing towards the seat cushion frame, the first portion of the upper rail possessing a connection portion whose outside surface is connected to the seat cushion frame and only a single contact portion whose outside surface is elevationally offset from the seat cushion frame to define a clearance between the outside surface of the contact portion and the seat cushion frame, the single contact portion being located to one side of the connection portion when viewed in cross-section the upper rail including a pair of side portions and a pair of flange portions, each side portion extending from an end of the first portion and each flange portion extending from one of the side portions.

8. The seat slide device for a vehicle according to claim 7, wherein the upper rail includes only a single stepped portion extending between the connecting portion and the single contact portion.

9. The seat slide device for a vehicle according to claim 7, wherein the intermediately located slide permitting members include rollers and balls.

10. The seat slide device for a vehicle according to claim 7, wherein the contact portion includes a downwardly facing inner surface, the intermediately located slide permitting members engaging the downwardly facing inner surface of the contact portion of the upper rail.

11. The seat slide device for a vehicle according to claim 7, wherein the lower rail includes a pair of plate parts connected to each other, each plate part possessing a vertical wall portion, a horizontal wall portion extending from the vertical wall portion, and a flange portion extending obliquely from the horizontal wall portion.

12. The seat slide device for a vehicle according to claim 7, wherein said flange portion extends inwardly and upwardly.

13. The seat slide device for a vehicle according to claim 7, including a hinge bracket connected to a forward end of said lower rail to permit pivoting connection of the lower rail to the floor of the vehicle at a pivot point.

14. The seat slide device for a vehicle according to claim 13, including a lock mechanism positioned at a rear portion of the lower rail to lock the lower rail to the floor of the vehicle.

* * * * *